US012266102B2

(12) United States Patent
Hashimoto et al.

(10) Patent No.: US 12,266,102 B2
(45) Date of Patent: Apr. 1, 2025

(54) ATTENUATION DISTRIBUTION IMAGE CREATING DEVICE, IMAGE PROCESSING DEVICE, RADIATION COMPUTED TOMOGRAPHY SYSTEM, ATTENUATION DISTRIBUTION IMAGE CREATING METHOD, AND IMAGE PROCESSING METHOD

(71) Applicant: HAMAMATSU PHOTONICS K.K., Hamamatsu (JP)

(72) Inventors: Fumio Hashimoto, Hamamatsu (JP); Masanori Ito, Hamamatsu (JP); Kibo Ote, Hamamatsu (JP); Takashi Isobe, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 437 days.

(21) Appl. No.: 17/795,295

(22) PCT Filed: Jan. 26, 2021

(86) PCT No.: PCT/JP2021/002628
§ 371 (c)(1),
(2) Date: Jul. 26, 2022

(87) PCT Pub. No.: WO2021/153555
PCT Pub. Date: Aug. 5, 2021

(65) Prior Publication Data
US 2023/0072175 A1 Mar. 9, 2023

(30) Foreign Application Priority Data
Jan. 28, 2020 (JP) .................................. 2020-011664

(51) Int. Cl.
*G06T 7/00* (2017.01)
*G06V 10/25* (2022.01)
*G06V 10/82* (2022.01)

(52) U.S. Cl.
CPC ............ *G06T 7/0012* (2013.01); *G06V 10/25* (2022.01); *G06V 10/82* (2022.01); *G06T 2207/10081* (2013.01); *G06T 2207/10104* (2013.01)

(58) Field of Classification Search
CPC ....... G01T 1/1615; A61B 6/032; A61B 6/841; H01J 37/06; H01J 2237/15
(Continued)

(56) References Cited

U.S. PATENT DOCUMENTS 7,847,266 B2 * 12/2010 Zhou ....................... H01J 37/06
250/503.1
8,577,129 B2 * 11/2013 Reeves ..................... G06T 5/70
382/128
(Continued)

FOREIGN PATENT DOCUMENTS

| JP | S63-085481 A | 4/1988 |
| JP | 2017-142131 A | 8/2017 |
| JP | 2018-105734 A | 7/2018 |

OTHER PUBLICATIONS

Hwang, Donghwi, et al., "Improving the Accuracy of Simultaneously Reconstructed Activity and Attenuation Maps Using Deep Learning," The Journal of Nuclear Medicine, vol. 59, No. 10, 2018, pp. 1624-1629.
(Continued)

*Primary Examiner* — Yosef Kassa
(74) *Attorney, Agent, or Firm* — Faegre Drinker Biddle & Reath LLP

(57) ABSTRACT

A radiation tomography system includes a radiation tomography apparatus and an image processing apparatus. The
(Continued)

image processing apparatus includes an image reconstruction unit, an attenuation distribution image creation unit, and an attenuation correction unit. The attenuation distribution image creation unit includes a first processing unit and a second processing unit. The first processing unit creates and outputs an intermediate image based on an emission scan image using a trained neural network. The second processing unit creates and outputs an attenuation distribution image based on the intermediate image.

10 Claims, 14 Drawing Sheets

(58) Field of Classification Search
USPC ......................................................... 382/128
See application file for complete search history.

(56) References Cited

U.S. PATENT DOCUMENTS

| | | | |
|---|---|---|---|
| 9,562,962 B2* | 2/2017 | Keller, III | F41A 17/06 |
| 9,754,371 B2* | 9/2017 | Kateb | A61B 5/0042 |
| 10,593,071 B2* | 3/2020 | Ding | G06T 11/006 |
| 10,769,785 B2* | 9/2020 | Fahmi | G06N 3/045 |

OTHER PUBLICATIONS

Liu, Fang, et al., "A deep learning approach for $^{18}$F-FDG PET attenuation correction," EJNMMI Physics 5:24, 2018, pp. 1-15.
International Preliminary Report on Patentability mailed Aug. 11, 2022 for PCT/JP2021/002628.

* cited by examiner

ATTENUATION DISTRIBUTION IMAGE CREATING DEVICE, IMAGE PROCESSING DEVICE, RADIATION COMPUTED TOMOGRAPHY SYSTEM, ATTENUATION DISTRIBUTION IMAGE CREATING METHOD, AND IMAGE PROCESSING METHOD

TECHNICAL FIELD

The present disclosure relates to an apparatus and a method for creating an attenuation distribution image, and an apparatus and a method for performing attenuation correction of an emission scan image using the attenuation distribution image.

BACKGROUND ART

Radiation tomography apparatuses capable of acquiring a tomographic image of a subject (living body) include a positron emission tomography (PET) apparatus and a single photon emission computed tomography (SPECT) apparatus.

The PET apparatus includes a detection unit having a large number of small radiation detectors arranged around a measurement space in which the subject is placed. The PET apparatus detects a photon pair of an energy of 511 keV generated by electron-positron annihilation in the subject into which a positron-emitting isotope (RI source) is introduced by a coincidence method using the detection unit, and collects coincidence information. Then, a tomographic image showing a spatial distribution of generation frequency of the photon pairs in the measurement space (that is, a spatial distribution of the RI sources) can be reconstructed based on the collected many pieces of coincidence information.

In this case, a dynamic PET image including tomographic images of a plurality of frames can be obtained by dividing list data in which coincidence information collected by the PET apparatus is arranged in time series into the plurality of frames in a collection order, and performing image reconstruction processing using data included in each frame in the list data. The PET apparatus plays an important role in a nuclear medicine field and the like, and can be used to study, for example, a biological function or a brain high-order function.

Photons generated in the subject are absorbed and attenuated when passing through the subject, and are also absorbed and attenuated when passing through a bed on which the subject is placed. Therefore, in order to acquire a more accurate tomographic image, it is necessary to perform attenuation correction.

For example, a tomographic image (emission scan image) is acquired by performing a measurement (emission scan) on the subject into which a drug containing an RI source has been injected by using the PET apparatus, and further, a tomographic image (transmission scan image) is acquired by performing a measurement (transmission scan) while rotating an RI source around the subject into which the drug has not been injected. Then, the attenuation correction of the emission scan image is performed using the transmission scan image.

For the attenuation correction of the emission scan image, the transmission scan image acquired by performing the transmission scan by the PET apparatus as described above may be used, and in addition, an X-ray CT scan image acquired by performing a scan by an X-ray CT apparatus may be used. Therefore, in order to perform the attenuation correction to acquire the more accurate tomographic image, the PET apparatus needs to have a transmission scan mechanism or an X-ray CT scan mechanism. This is one of the factors which prevent simplification and cost reduction of the PET apparatus.

Hereinafter, an attenuation distribution image includes an attenuation distribution image at an energy of 511 keV obtained from the transmission scan image and the X-ray CT scan image. The attenuation distribution image represents an attenuation distribution of photons in the subject. By using the attenuation distribution image, the attenuation correction of the emission scan image can be performed.

In techniques described in Non Patent Documents 1 and 2, a convolutional neural network (CNN) is trained using a large number of pairs of the emission scan images and the transmission scan images, the attenuation distribution image is created from the emission scan image of an attenuation correction object by the trained CNN, and the attenuation correction of the emission scan image is performed using the attenuation distribution image. This technique enables the attenuation correction by using the trained CNN even when the PET apparatus does not have the transmission scan mechanism or the X-ray CT scan mechanism.

CITATION LIST

Non Patent Literature

Non Patent Document 1: Fang Liu et al., "A deep learning approach for 18F-FDG PET attenuation correction", EJNMMI Physics 5:24, 2018
Non Patent Document 2: Donghwi Hwang et al., "Improving the Accuracy of Simultaneously Reconstructed Activity and Attenuation Maps Using Deep Learning", Journal of Nuclear Medicine Vol. 59 No. 10, pp. 1624-1629, 2018

SUMMARY OF INVENTION

Technical Problem

The techniques described in Non Patent Documents 1 and 2 are based on the condition that a PET apparatus used in acquiring a large number of pairs of the emission scan images and the transmission scan images used for training of the CNN is the same as a PET apparatus used in acquiring the emission scan image of the attenuation correction object. In this technique, for the emission scan image acquired using a PET apparatus different from a PET apparatus used for training of the CNN, an accurate attenuation distribution image cannot be created, and accurate attenuation correction cannot be performed.

An object of the present invention is to provide an apparatus and a method capable of creating a more accurate attenuation distribution image from an emission scan image even when the emission scan image is acquired using a radiation tomography apparatus different from a radiation tomography apparatus used for training of a neural network.

Solution to Problem

A first aspect of the present invention is an attenuation distribution image creation apparatus. The attenuation distribution image creation apparatus includes (1) a first processing unit for inputting an emission scan image of an attenuation correction object to a neural network being trained using an emission scan image of each of a plurality of subjects as an input image and a subject region extraction image based on an attenuation distribution image as a teacher image, and outputting an intermediate image from the neural network; and (2) a second processing unit for creating an attenuation distribution image by adding an image of a bed on which the subject is placed in acquiring the emission scan image of the attenuation correction object to the intermediate image.

A second aspect of the present invention is an attenuation distribution image creation apparatus. The attenuation distribution image creation apparatus includes (1) a first processing unit for inputting an emission scan image of an attenuation correction object to a neural network being trained using an emission scan image of each of a plurality of subjects as an input image and an attenuation distribution image as a teacher image, and outputting an intermediate image from the neural network; and (2) a second processing unit for creating an attenuation distribution image by adding an image of a bed on which the subject is placed in acquiring the emission scan image of the attenuation correction object to a subject region extraction image based on the intermediate image.

Another aspect of the present invention is an image processing apparatus. The image processing apparatus includes (1) the attenuation distribution image creation apparatus of the above first or second aspect; and (2) an attenuation correction unit for performing attenuation correction of the emission scan image of the attenuation correction object using the attenuation distribution image created by the attenuation distribution image creation apparatus.

Another aspect of the present invention is a radiation tomography system. The radiation tomography system includes (1) a radiation tomography apparatus for acquiring an emission scan image of an attenuation correction object; (2) the attenuation distribution image creation apparatus of the above first or second aspect; and (3) an attenuation correction unit for performing attenuation correction of the emission scan image of the attenuation correction object using the attenuation distribution image created by the attenuation distribution image creation apparatus.

A first aspect of the present invention is an attenuation distribution image creation method. The attenuation distribution image creation method includes (1) a first processing step of inputting an emission scan image of an attenuation correction object to a neural network being trained using an emission scan image of each of a plurality of subjects as an input image and a subject region extraction image based on an attenuation distribution image as a teacher image, and outputting an intermediate image from the neural network; and (2) a second processing step of creating an attenuation distribution image by adding an image of a bed on which the subject is placed in acquiring the emission scan image of the attenuation correction object to the intermediate image.

A second aspect of the present invention is an attenuation distribution image creation method. The attenuation distribution image creation method includes (1) a first processing step of inputting an emission scan image of an attenuation correction object to a neural network being trained using an emission scan image of each of a plurality of subjects as an input image and an attenuation distribution image as a teacher image, and outputting an intermediate image from the neural network; and (2) a second processing step of creating an attenuation distribution image by adding an image of a bed on which the subject is placed in acquiring the emission scan image of the attenuation correction object to a subject region extraction image based on the intermediate image.

Another aspect of the present invention is an image processing method. The image processing method includes (1) the attenuation distribution image creation method of the above first or second aspect; and (2) an attenuation correction step of performing attenuation correction of the emission scan image of the attenuation correction object using the attenuation distribution image created by the attenuation distribution image creation method.

Advantageous Effects of Invention

According to the aspects of the present invention, it is possible to create a more accurate attenuation distribution image from an emission scan image even when the emission scan image is acquired using a radiation tomography apparatus different from a radiation tomography apparatus used for training of a neural network.

DESCRIPTION OF EMBODIMENTS

Hereinafter, embodiments of an attenuation distribution image creation apparatus, an image processing apparatus, a radiation tomography system, an attenuation distribution image creation method, and an image processing method will be described in detail with reference to the accompanying drawings. In the description of the drawings, the same elements will be denoted by the same reference signs, and redundant description will be omitted. The present invention is not limited to these examples.

Figure 1:
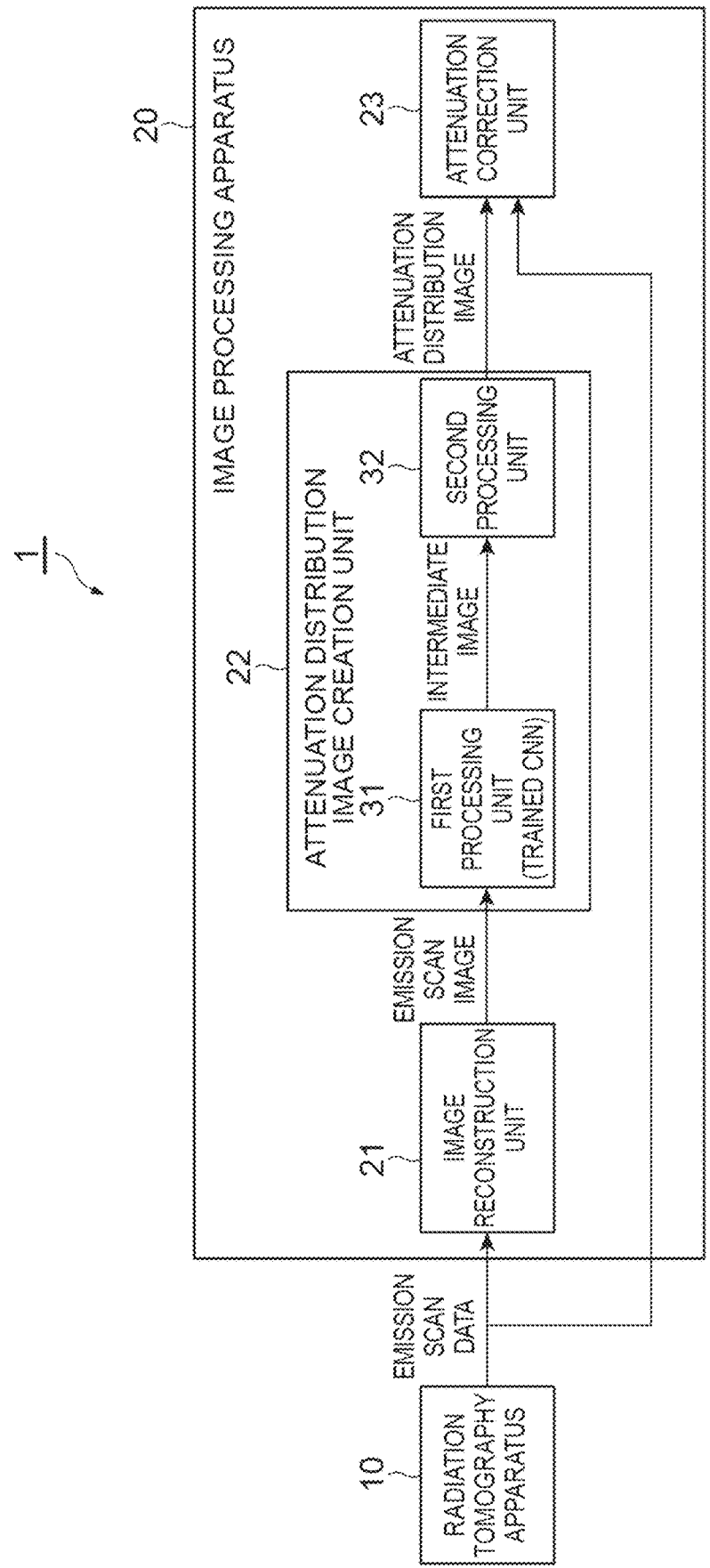
FIG. 1 is a diagram illustrating a configuration of a radiation tomography system 1.

FIG. 1 is a diagram illustrating a configuration of a radiation tomography system 1. The radiation tomography system 1 includes a radiation tomography apparatus 10 and an image processing apparatus 20. The image processing apparatus 20 includes an image reconstruction unit 21, an attenuation distribution image creation unit 22, and an attenuation correction unit 23. The attenuation distribution image creation unit (attenuation distribution image creation apparatus) 22 includes a first processing unit 31 and a second processing unit 32.

The radiation tomography apparatus 10 is an apparatus for collecting list data (emission scan data) for reconstructing a tomographic image (emission scan image) of a subject by performing an emission scan. Examples of the radiation tomography apparatus 10 include a PET apparatus and a SPECT apparatus. In the following description, it is assumed that the radiation tomography apparatus 10 is a PET apparatus.

The radiation tomography apparatus 10 includes a detection unit having a large number of small radiation detectors arranged around a measurement space in which the subject placed on a bed is arranged. The radiation tomography apparatus 10 detects a photon pair of an energy of 511 keV generated by electron-positron annihilation in the subject into which a positron-emitting isotope (RI source) is injected by a coincidence method using the detection unit, and accumulates coincidence information. Further, the radiation tomography apparatus 10 outputs, to the image processing apparatus 20, the list data (emission scan data) in which the accumulated many pieces of the coincidence information are arranged in time series.

The list data includes identification information and detection time information of a pair of radiation detectors used in coincidence detection of the photon pair. The list data may further include energy information of photons detected by the radiation detectors and detection time difference information of the pair of radiation detectors.

As the image processing apparatus 20, a computer including a CPU, a RAM, a ROM, a hard disk drive, and the like is used. Further, the image processing apparatus 20 includes an input unit (for example, a keyboard or a mouse) for receiving an input of an operator, and includes a display unit (for example, a liquid crystal display) for displaying an image and the like.

In the image processing apparatus 20, the image reconstruction unit 21 reconstructs the emission scan image based on the emission scan data, the attenuation distribution image creation unit 22 creates an attenuation distribution image based on the emission scan image, and the attenuation correction unit 23 performs attenuation correction of the emission scan image based on the attenuation distribution image.

As techniques for reconstructing the emission scan image based on the emission scan data in the image reconstruction unit 21, a maximum likelihood expectation maximization (ML-EM) method, and a successive approximation type image reconstruction technique based on a block iterative method obtained by improving the above method are known. Further, as the successive approximation type image reconstruction technique by the block iterative method, an ordered subset ML-EM (OSEM) method, a row-action maximum likelihood algorithm (RAMLA) method, a dynamic RAMLA (DRAMA) method, and the like are known.

The first processing unit 31 of the attenuation distribution image creation unit 22 inputs the emission scan image created by the reconstruction processing by the image reconstruction unit 21, and creates and outputs an intermediate image based on the emission scan image using a neural network after training. The neural network used here is preferably a convolutional neural network (CNN). The second processing unit 32 inputs the intermediate image created by the first processing unit 31, and creates and outputs an attenuation distribution image based on the intermediate image. Details of the first processing unit 31 and the second processing unit 32 will be described later.

The attenuation correction unit 23 inputs the emission scan data, and inputs the attenuation distribution image created by the attenuation distribution image creation unit 22. Further, the attenuation correction unit 23 performs image reconstruction with the attenuation correction based on the attenuation distribution image, and creates a tomographic image after the correction.

Figure 2:
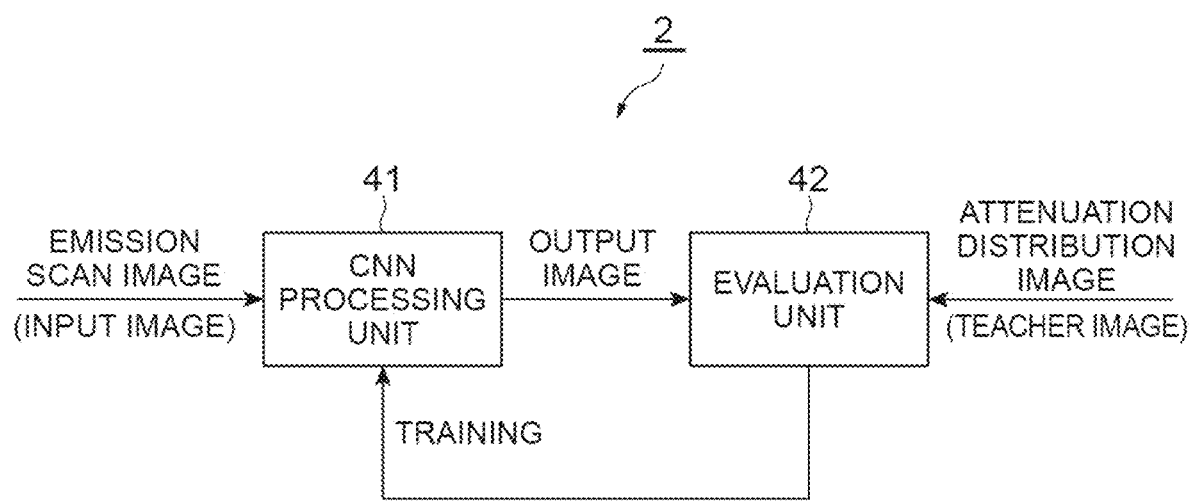
FIG. 2 is a diagram illustrating a configuration of a training system 2 for training a CNN used in a first processing unit 31 of an attenuation distribution image creation unit 22.

FIG. 2 is a diagram illustrating a configuration of a training system 2 for training the CNN used in the first processing unit 31 of the attenuation distribution image creation unit 22. The training system 2 includes a CNN processing unit 41 and an evaluation unit 42.

In the training of the CNN, first, an emission scan image and an attenuation distribution image of each of a plurality of subjects are prepared. The attenuation distribution image prepared here may be a transmission scan image acquired by performing a transmission scan by the PET apparatus or may be an X-ray CT scan image acquired by performing a scan by an X-ray CT apparatus.

The CNN processing unit 41 inputs the emission scan image of each subject to the CNN as an input image and outputs an output image from the CNN. The evaluation unit 42 uses the attenuation distribution image of the subject (or a subject region extraction image (described later) based on the attenuation distribution image) as a teacher image to calculate a difference (for example, a L2 norm) between the output image from the CNN processing unit 41 and the teacher image. The CNN processing unit 41 corrects parameters of the CNN based on the difference calculated by the evaluation unit 42. By performing such a series of processes using the emission scan images and the attenuation distribution images of the plurality of subjects, the CNN can be trained.

Next, processing contents of the first processing unit 31 and the second processing unit 32 of the attenuation distribution image creation unit 22 will be described. There are two aspects for the processing. Further, correspondingly, there are two aspects for the CNN training processing in the training system 2.

Figure 3:
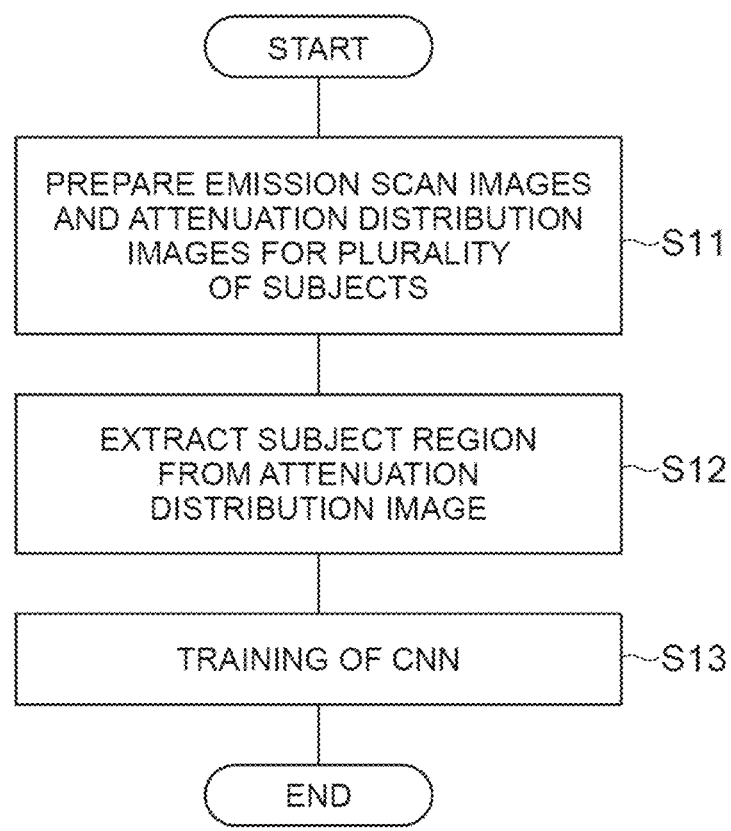
FIG. 3 is a flowchart of CNN training of a first aspect.
Figure 4:
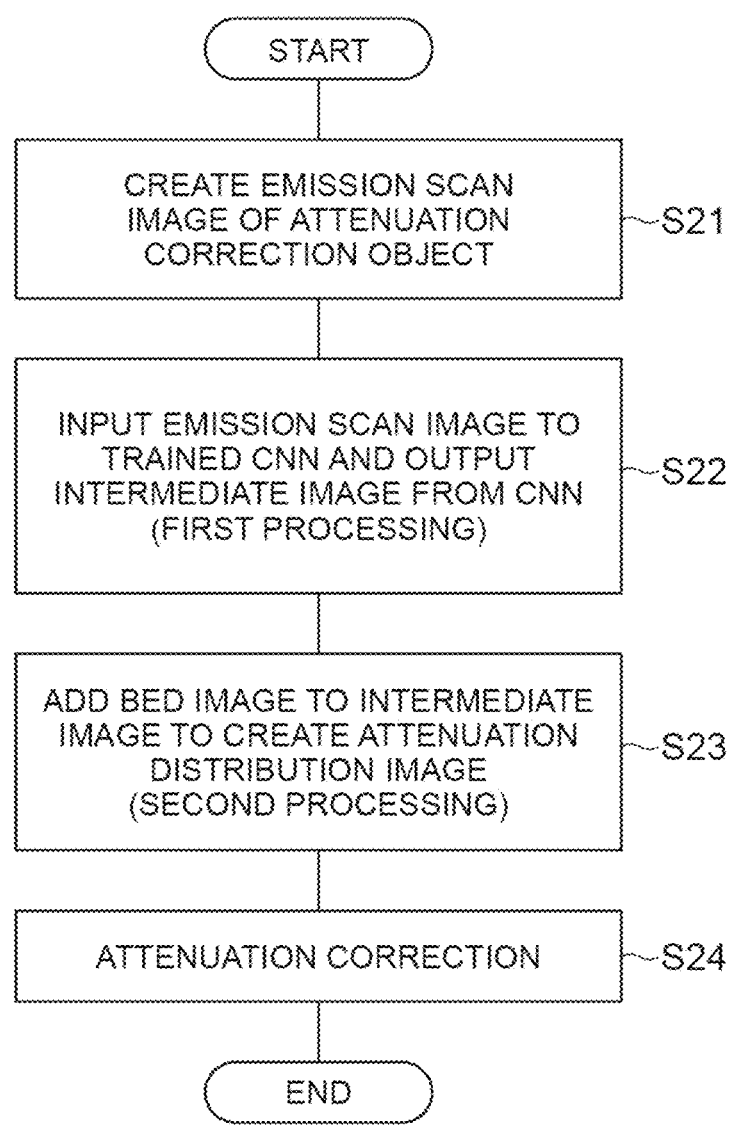
FIG. 4 is a flowchart of attenuation distribution image creation and attenuation correction of the first aspect.

The CNN training and the attenuation distribution image creation of a first aspect will be described with reference to FIG. 3 and FIG. 4. FIG. 3 is a flowchart of the CNN training of the first aspect. FIG. 4 is a flowchart of the attenuation distribution image creation and the attenuation correction of the first aspect.

In the CNN training of the first aspect, in a step S11, the respective emission scan images and the attenuation distribution images of the plurality of subjects are prepared. The attenuation distribution image contains a subject image, and in addition, contains an image of the bed on which the subject is placed, and further, may contain other unnecessary images. The unnecessary image is an image unnecessary for diagnosing the state of the subject based on the tomographic image, and is, for example, an arm image.

In a step S12, the bed image and the unnecessary image are removed from the attenuation distribution image of each of the plurality of subjects, and a subject region (for example, head region) is extracted from the attenuation distribution image to create a subject region extraction image. In a step S13, the training system 2 trains the CNN using the emission scan image (input image) and the subject region extraction image (teacher image) of each of the plurality of subjects.

In the attenuation distribution image creation of the first aspect, in a step S21, the image reconstruction unit 21 creates the emission scan image based on the emission scan data acquired by the radiation tomography apparatus 10. The emission scan image created here becomes the attenuation correction object.

In a first processing step S22, the first processing unit 31 inputs the emission scan image of the attenuation correction object to the trained CNN and outputs the intermediate image from the CNN. The intermediate image is the attenuation distribution image corresponding to the emission scan image of the attenuation correction object, but does not contain the image of the bed (bed of the radiation tomography apparatus 10) on which the subject is placed when the emission scan image is acquired.

In a second processing step S23, the second processing unit 32 adds the image of the bed (bed of the radiation tomography apparatus 10) on which the subject is placed in acquiring the emission scan image of the attenuation correction object to the intermediate image to create the attenuation distribution image including the bed image. In an attenuation correction step S24, the attenuation correction unit 23 performs attenuation correction of the emission scan image created in the step S21 using the attenuation distribution image created in the step S23 to create the tomographic image after the attenuation correction.

In addition, in the CNN training (step S13) and the processing by the first processing unit 31 (step S22), it is preferable that the number of pixels of the image to be input to the CNN and the size of the subject in the image coincide with each other. It is preferable to perform preprocessing for the above before the step S13 or before the step S22.

Figure 5:
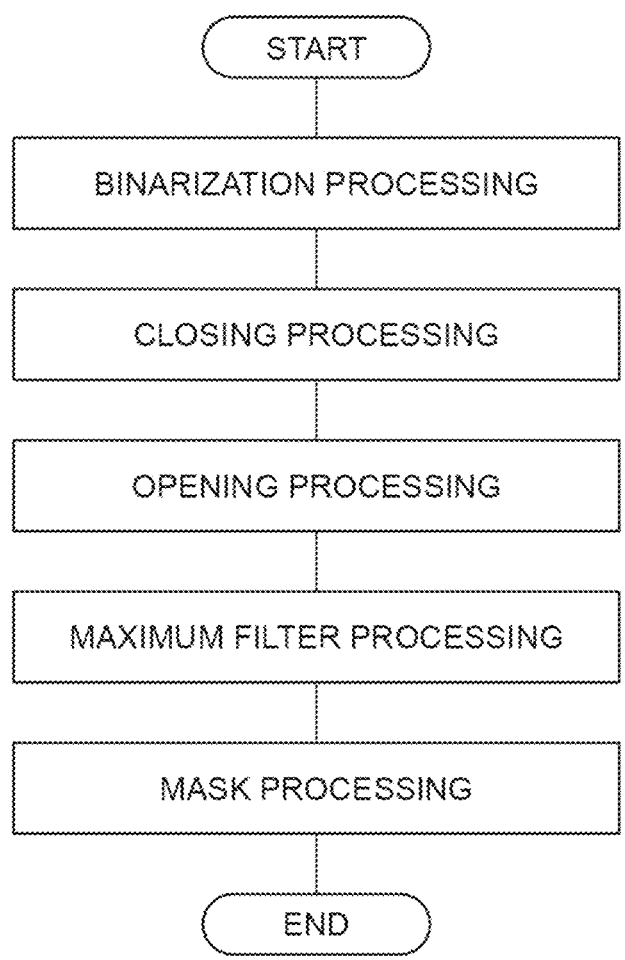
FIG. 5 is a flowchart of processing (step S12) for creating a subject region extraction image based on an attenuation distribution image.
Figure 6:
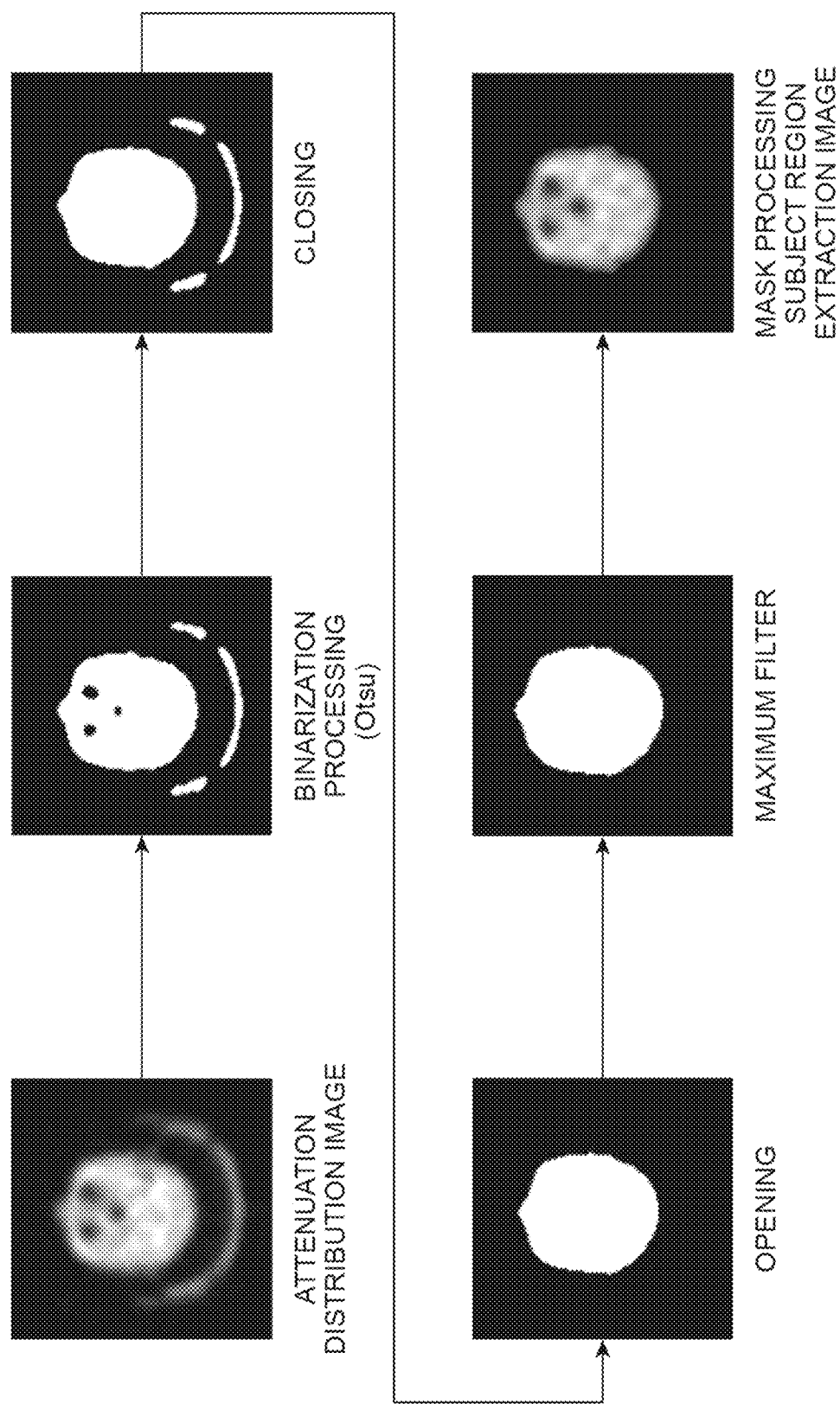
FIG. 6 is a diagram illustrating an example of images created in respective steps of the flowchart of FIG. 5.

Further, in the processing of extracting the subject region from the attenuation distribution image (step S12), when the respective regions of the subject image, the bed image, and the unnecessary image are known in advance in the attenuation distribution image, the subject region extraction image can be easily created. Further, as shown in a flowchart of FIG. 5 and an example of images of FIG. 6, the subject region extraction image can be easily created also by sequentially performing binarization processing, closing processing, opening processing, maximum filter processing, and mask processing on the attenuation distribution image.

Figure 7:
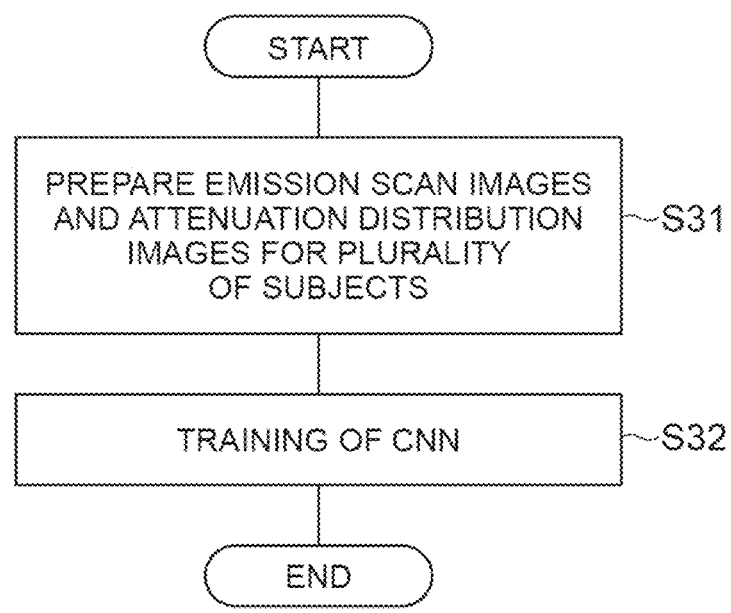
FIG. 7 is a flowchart of CNN training of a second aspect.
Figure 8:
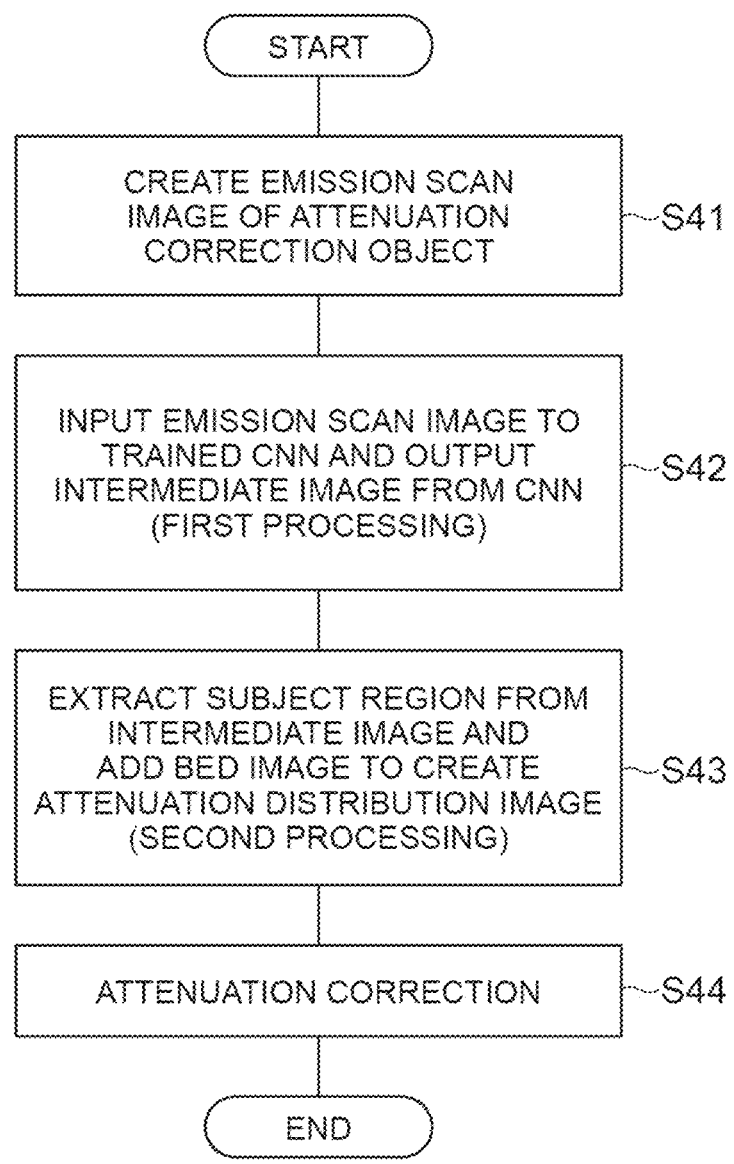
FIG. 8 is a flowchart of attenuation distribution image creation and attenuation correction of the second aspect.

The CNN training and the attenuation distribution image creation of a second aspect will be described with reference to FIG. 7 and FIG. 8. FIG. 7 is a flowchart of the CNN training of the second aspect. FIG. 8 is a flowchart of the attenuation distribution image creation and the attenuation correction of the second aspect.

In the CNN training of the second aspect, in a step S31, the respective emission scan images and the attenuation distribution images of the plurality of subjects are prepared. The attenuation distribution image contains the subject image, and in addition, contains the image of the bed on which the subject is placed, and further, may contain other unnecessary images.

In a step S32, the training system 2 trains the CNN using the emission scan image (input image) and the attenuation distribution image (teacher image) of each of the plurality of subjects.

In the attenuation distribution image creation of the second aspect, in a step S41, the image reconstruction unit 21 creates the emission scan image based on the emission scan data acquired by the radiation tomography apparatus 10. The emission scan image created here becomes the attenuation correction object.

In a first processing step S42, the first processing unit 31 inputs the emission scan image of the attenuation correction object to the trained CNN and outputs the intermediate image from the CNN. The intermediate image is the attenuation distribution image corresponding to the emission scan image of the attenuation correction object, and may contain the image of the bed on which the subject is placed.

In a second processing step S43, the second processing unit 32 extracts the subject region from the intermediate image to create the subject region extraction image. Further, in the step S43, the second processing unit 32 adds the image of the bed (bed of the radiation tomography apparatus 10) on which the subject is placed in acquiring the emission scan image of the attenuation correction object to the subject region extraction image to create the attenuation distribution image including the bed image. In an attenuation correction step S44, the attenuation correction unit 23 performs attenuation correction of the emission scan image created in the step S41 using the attenuation distribution image created in the step S43 to create the tomographic image after the attenuation correction.

In addition, in the CNN training (step S32) and the processing by the first processing unit 31 (step S42), it is preferable that the number of pixels of the image to be input to the CNN and the size of the subject in the image coincide with each other. It is preferable to perform preprocessing for the above before the step S32 or before the step S42. Further, the processing of extracting the subject region from the intermediate image in the second aspect (step S43) can be performed in the same manner as the processing of extracting the subject region from the attenuation distribution image in the first aspect (step S12).

Next, examples will be described. A first example described below corresponds to the first aspect of the above embodiment, and a second example corresponds to the second aspect of the above embodiment.

In both the first example and the second example, the emission scan images and the attenuation distribution images corresponding to 1091 cases were used for training of the CNN. These images were acquired using a head PET apparatus SHR-12000 (hereinafter referred to as "apparatus A") manufactured by Hamamatsu Photonics K.K. The apparatus A has the transmission scan mechanism, and the attenuation distribution image is the transmission scan image.

Further, in both the first example and the second example, the emission scan image (FIG. 9) of the attenuation correction object was acquired using a whole-body PET/CT apparatus SHR-74000 (hereinafter referred to as "apparatus B") manufactured by Hamamatsu Photonics K.K. The apparatus B has the X-ray CT scan mechanism. The X-ray CT scan image (FIG. 10) acquired by this mechanism was used as a correct image only for comparison with the attenuation distribution image created by the example. The apparatus A and the apparatus B are different in the shape of the bed on which the subject is placed.

Figure 9:
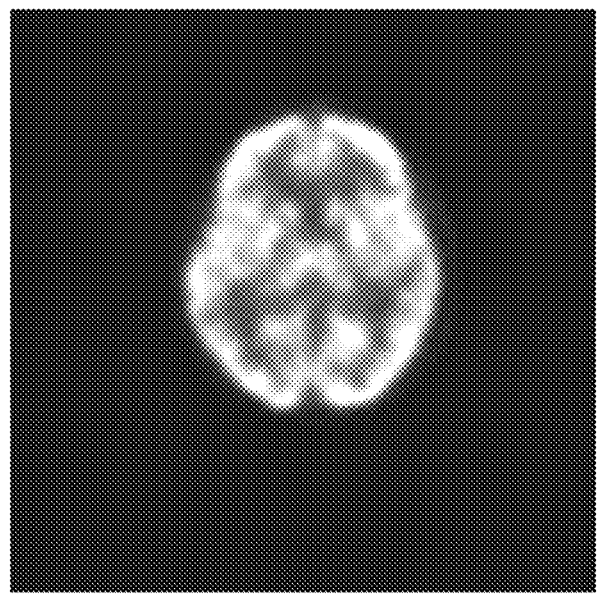
FIG. 9 shows an emission scan image of an attenuation correction object.
Figure 10:
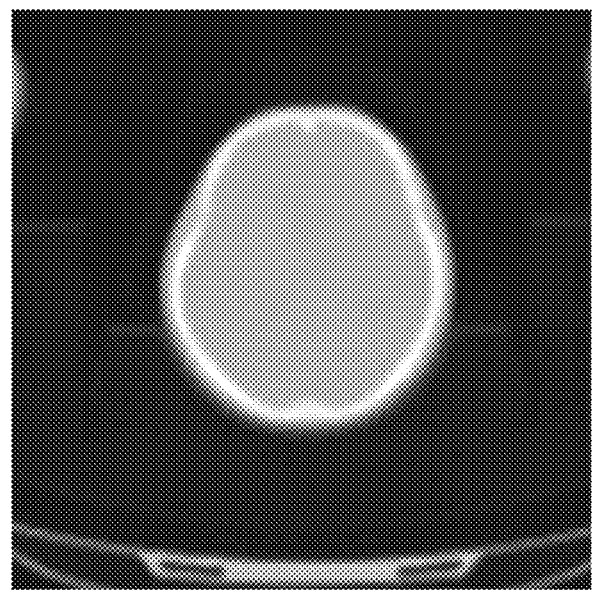
FIG. 10 shows an X-ray CT scan image (correct image).
Figure 11:
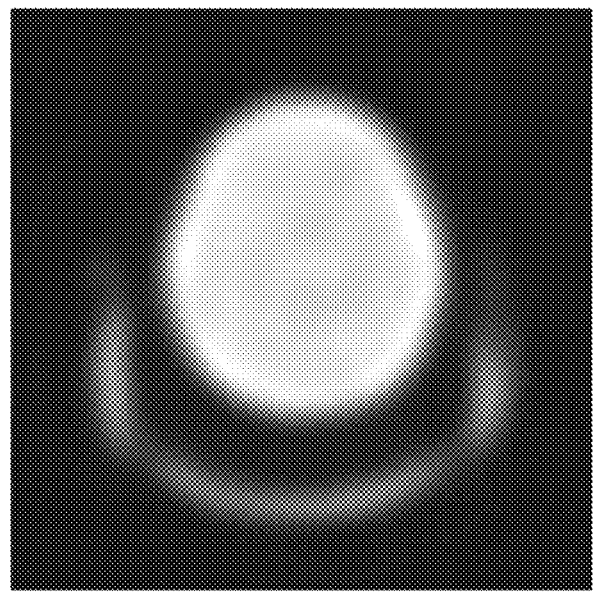
FIG. 11 shows an intermediate image created in a step S22 when a bed image is not removed in a step S12 in a first example, and an intermediate image created in a step S42 in a second example.
Figure 12:
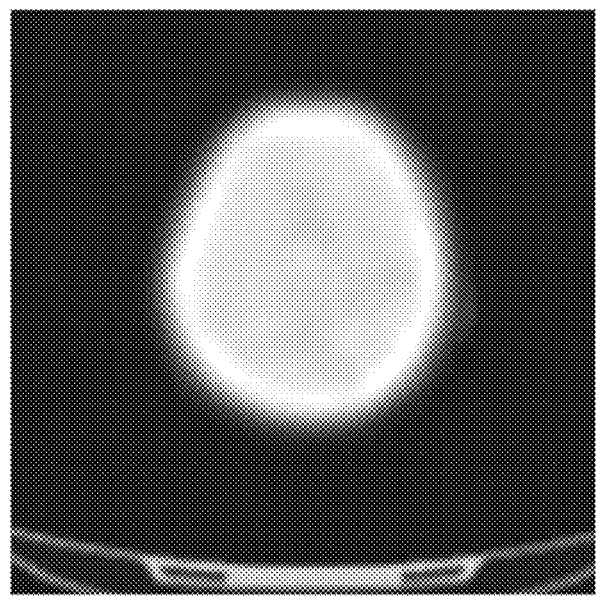
FIG. 12 shows an attenuation distribution image created in a step S23 in the first example.
Figure 13:
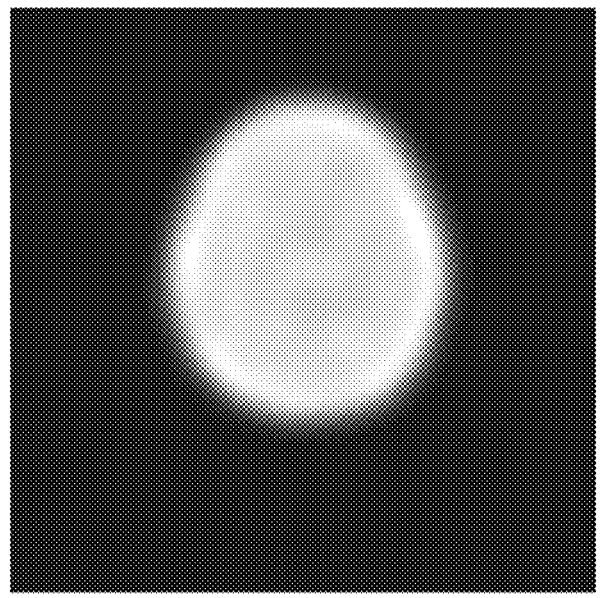
FIG. 13 shows a subject region extraction image created in a step S43 in the second example.
Figure 14:
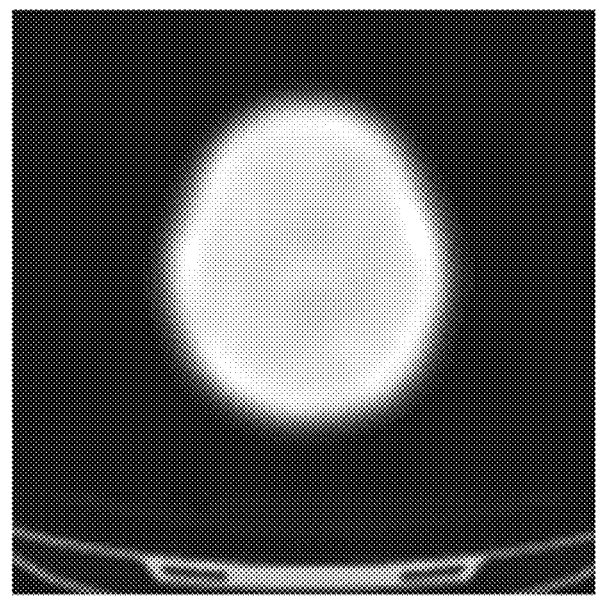
FIG. 14 shows an attenuation distribution image created in a step S43 in the second example.

FIG. 9 shows the emission scan image of the attenuation correction object. FIG. 10 shows the X-ray CT scan image (correct image). FIG. 11 shows the intermediate image created in the step S22 when the bed image is not removed in the step S12 in the first example. FIG. 12 shows the attenuation distribution image created in the step S23 in the first example. FIG. 11 shows also the intermediate image created in the step S42 in the second example. FIG. 13 shows the subject region extraction image created in the step S43 in the second example. FIG. 14 shows the attenuation distribution image created in the step S43 in the second example.

Even when the shapes of the beds of the apparatus A and the apparatus B are different from each other, the attenuation distribution images (FIG. 12 and FIG. 14) respectively created by the first example and the second example are in good agreement with the X-ray CT scan image (correct image, FIG. 10) including the shape of the bed image. As described above, in the present embodiment, even when the emission scan image is acquired using the PET apparatus different from the PET apparatus used for training of the neural network, a more accurate attenuation distribution image can be created from the emission scan image. Further, by using the above attenuation distribution image, it is possible to perform more accurate attenuation correction of the emission scan image.

The present invention is not limited to the embodiments and configuration examples described above, and various modifications are possible. For example, since there are many types of drugs to be injected into the subject, the CNN training (steps S13 and S32) may be performed for each drug, and in the first processing (steps S22 and S42) in which the intermediate image is obtained based on the emission scan image of the attenuation correction object, the CNN trained for the drug injected into the subject at the time of emission scan may be used.

Further, the CNN training (steps S13 and S32) may be performed using the emission scan image and the attenuation distribution image acquired by injecting a mixture of a plurality of types of drugs into the subject, and in the first processing (steps S22 and S42) in which the intermediate image is obtained based on the emission scan image of the attenuation correction object, the CNN trained for the mixture of the plurality of types of drugs may be used. In this case, since the feature of the attenuation distribution that does not depend on the type of drug can be captured in the CNN training (steps S13 and S32), an accurate attenuation distribution image can be created regardless of the type of drug injected into the subject in acquiring the emission scan image of the attenuation correction object or even when the injected drug is unknown.

The first attenuation distribution image creation apparatus of the above embodiment includes (1) a first processing unit for inputting an emission scan image of an attenuation correction object to a neural network being trained using an emission scan image of each of a plurality of subjects as an input image and a subject region extraction image based on an attenuation distribution image as a teacher image, and outputting an intermediate image from the neural network; and (2) a second processing unit for creating an attenuation distribution image by adding an image of a bed on which the subject is placed in acquiring the emission scan image of the attenuation correction object to the intermediate image.

The second attenuation distribution image creation apparatus of the above embodiment includes (1) a first processing unit for inputting an emission scan image of an attenuation correction object to a neural network being trained using an emission scan image of each of a plurality of subjects as an input image and an attenuation distribution image as a teacher image, and outputting an intermediate image from the neural network; and (2) a second processing unit for creating an attenuation distribution image by adding an image of a bed on which the subject is placed in acquiring the emission scan image of the attenuation correction object to a subject region extraction image based on the intermediate image.

The image processing apparatus of the above embodiment includes (1) the above first or second attenuation distribution image creation apparatus; and (2) an attenuation correction unit for performing attenuation correction of the emission scan image of the attenuation correction object using the attenuation distribution image created by the attenuation distribution image creation apparatus.

The radiation tomography system of the above embodiment includes (1) a radiation tomography apparatus for acquiring an emission scan image of an attenuation correction object; (2) the above first or second attenuation distribution image creation apparatus; and (3) an attenuation correction unit for performing attenuation correction of the emission scan image of the attenuation correction object using the attenuation distribution image created by the attenuation distribution image creation apparatus.

The first attenuation distribution image creation method of the above embodiment includes (1) a first processing step of inputting an emission scan image of an attenuation correction object to a neural network being trained using an emission scan image of each of a plurality of subjects as an input image and a subject region extraction image based on an attenuation distribution image as a teacher image, and outputting an intermediate image from the neural network; and (2) a second processing step of creating an attenuation distribution image by adding an image of a bed on which the subject is placed in acquiring the emission scan image of the attenuation correction object to the intermediate image.

The second attenuation distribution image creation method of the above embodiment includes (1) a first processing step of inputting an emission scan image of an attenuation correction object to a neural network being trained using an emission scan image of each of a plurality of subjects as an input image and an attenuation distribution image as a teacher image, and outputting an intermediate image from the neural network; and (2) a second processing step of creating an attenuation distribution image by adding an image of a bed on which the subject is placed in acquiring the emission scan image of the attenuation correction object to a subject region extraction image based on the intermediate image.

The image processing method of the above embodiment includes (1) the above first or second attenuation distribution image creation method; and (2) an attenuation correction step of performing attenuation correction of the emission scan image of the attenuation correction object using the attenuation distribution image created by the attenuation distribution image creation method.

INDUSTRIAL APPLICABILITY

The present invention can be used as an apparatus and a method capable of creating a more accurate attenuation distribution image from an emission scan image even when the emission scan image is acquired using a radiation tomography apparatus different from a radiation tomography apparatus used for training of a neural network.

REFERENCE SIGNS LIST

1—radiation tomography system, 2—training system, 10—radiation tomography apparatus, 20—image processing apparatus, 21—image reconstruction unit, 22—attenuation distribution image creation unit, 23—attenuation correction unit, 31—first processing unit, 32—second processing unit, 41—CNN processing unit, 42—evaluation unit.

The invention claimed is:

1. An attenuation distribution image creation apparatus comprising:
   a first processing unit configured to input an emission scan image of an attenuation correction object to a neural network being trained using an emission scan image of each of a plurality of subjects as an input image and a subject region extraction image based on an attenuation distribution image as a teacher image, and output an intermediate image from the neural network; and
   a second processing unit configured to create an attenuation distribution image by adding an image of a bed on which the subject is placed in acquiring the emission scan image of the attenuation correction object to the intermediate image.

2. An attenuation distribution image creation apparatus comprising:
   a first processing unit configured to input an emission scan image of an attenuation correction object to a neural network being trained using an emission scan image of each of a plurality of subjects as an input image and an attenuation distribution image as a teacher image, and output an intermediate image from the neural network; and
   a second processing unit configured to create an attenuation distribution image by adding an image of a bed on which the subject is placed in acquiring the emission scan image of the attenuation correction object to a subject region extraction image based on the intermediate image.

3. An image processing apparatus comprising:
   the attenuation distribution image creation apparatus according to claim 1; and
   an attenuation correction unit configured to perform attenuation correction of the emission scan image of the attenuation correction object using the attenuation distribution image created by the attenuation distribution image creation apparatus.

4. A radiation tomography system comprising:
   a radiation tomography apparatus configured to acquire an emission scan image of an attenuation correction object;
   the attenuation distribution image creation apparatus according to claim 1; and
   an attenuation correction unit configured to perform attenuation correction of the emission scan image of the attenuation correction object using the attenuation distribution image created by the attenuation distribution image creation apparatus.

5. An attenuation distribution image creation method comprising:
   performing first processing of inputting an emission scan image of an attenuation correction object to a neural network being trained using an emission scan image of each of a plurality of subjects as an input image and a subject region extraction image based on an attenuation distribution image as a teacher image, and outputting an intermediate image from the neural network; and
   performing second processing of creating an attenuation distribution image by adding an image of a bed on which the subject is placed in acquiring the emission scan image of the attenuation correction object to the intermediate image.

6. An attenuation distribution image creation method comprising:
   performing first processing of inputting an emission scan image of an attenuation correction object to a neural network being trained using an emission scan image of each of a plurality of subjects as an input image and an attenuation distribution image as a teacher image, and outputting an intermediate image from the neural network; and
   performing second processing of creating an attenuation distribution image by adding an image of a bed on which the subject is placed in acquiring the emission scan image of the attenuation correction object to a subject region extraction image based on the intermediate image.

7. An image processing method comprising:
   the attenuation distribution image creation method according to claim 5; and
   performing attenuation correction of the emission scan image of the attenuation correction object using the attenuation distribution image created by the attenuation distribution image creation method.

8. An image processing apparatus comprising:
   the attenuation distribution image creation apparatus according to claim 2; and
   an attenuation correction unit configured to perform attenuation correction of the emission scan image of the attenuation correction object using the attenuation distribution image created by the attenuation distribution image creation apparatus.

9. A radiation tomography system comprising:
   a radiation tomography apparatus configured to acquire an emission scan image of an attenuation correction object;
   the attenuation distribution image creation apparatus according to claim 2; and
   an attenuation correction unit configured to perform attenuation correction of the emission scan image of the attenuation correction object using the attenuation distribution image created by the attenuation distribution image creation apparatus.

10. An image processing method comprising:
    the attenuation distribution image creation method according to claim 6; and
    performing attenuation correction of the emission scan image of the attenuation correction object using the attenuation distribution image created by the attenuation distribution image creation method.

* * * * *